(12) United States Patent
Li

(10) Patent No.: US 6,865,298 B2
(45) Date of Patent: Mar. 8, 2005

(54) COMPOUND DOCUMENT COMPRESSION BASED UPON NEIGHBORING PIXELS

(75) Inventor: Xin Li, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 642 days.

(21) Appl. No.: 09/823,399

(22) Filed: Mar. 30, 2001

(65) Prior Publication Data

US 2002/0176631 A1 Nov. 28, 2002

(51) Int. Cl.[7] ................................................ G06K 9/36
(52) U.S. Cl. ..................................... 382/238; 382/224
(58) Field of Search ............................... 382/224, 232, 382/238, 239, 244, 247, 246, 251; 375/240.02, 240.03; 341/67, 99

(56) References Cited

U.S. PATENT DOCUMENTS

| | | | |
|---|---|---|---|
| 5,680,129 A | 10/1997 | Weinberger et al. | 341/65 |
| 5,778,092 A | 7/1998 | MacLeod et al. | 382/176 |
| 5,835,034 A | * 11/1998 | Seroussi et al. | 341/65 |
| 5,903,676 A | * 5/1999 | Wu et al. | 382/244 |
| 5,960,116 A | 9/1999 | Kajiwara | 382/238 |
| 6,021,227 A | 2/2000 | Sapiro et al. | 382/239 |
| 6,038,346 A | 3/2000 | Ratnakar | 382/239 |
| 6,125,348 A | 9/2000 | Levine | 704/500 |

FOREIGN PATENT DOCUMENTS

| | | | |
|---|---|---|---|
| JP | 2001043363 | 2/2001 | G06T/7/00 |

OTHER PUBLICATIONS

Memon et al., A comparison of prediction schemes proposed for a new lossless image compression standard, May 12–15, 1996, Circuits and Systems, 1996. ISCAS '96., Connecting the World., 1996 IEEE International Symposium on, vol. 2, pp. 309–312.*

J. Ziv, A. Lempel; *A Universal Algorithm for Data Compression, IEEE Trans. on Information Theory*, IT–23(3), pp. 337–343, May 1977.

X. Wu, N. Memon, K. Saywood; *Context–based Adaptive Lossless/Nearly–Lossless Coding Scheme for Continuous-tone Images*, (33 pages).

L. Bottou, et al., *High quality document image compression using DjVu; Journal of Electronic Imaging*, (25 pages); vol. 7, pp. 410–425, Jul. 1998.

M. Weinberger, et al.; *The LOCO–1 Lossless Image Compression Algorithm: Principles and Standardization into JPEG–LS; IEEE Transactions on Image; Processing*; vol. 9, No. 8, Aug. 2000, pp. 1309–1324.

* cited by examiner

*Primary Examiner*—Yon J. Couso
(74) *Attorney, Agent, or Firm*—Marger Johnson & McCollom, PC

(57) ABSTRACT

A method for compression of compound images. The method determines a classification for a current pixel based upon its causal neighbors and codes the pixel according to a mode determined by the classification. This coding results in production of a symbol for the pixel and the symbol is then mapped to the output stream.

8 Claims, 3 Drawing Sheets

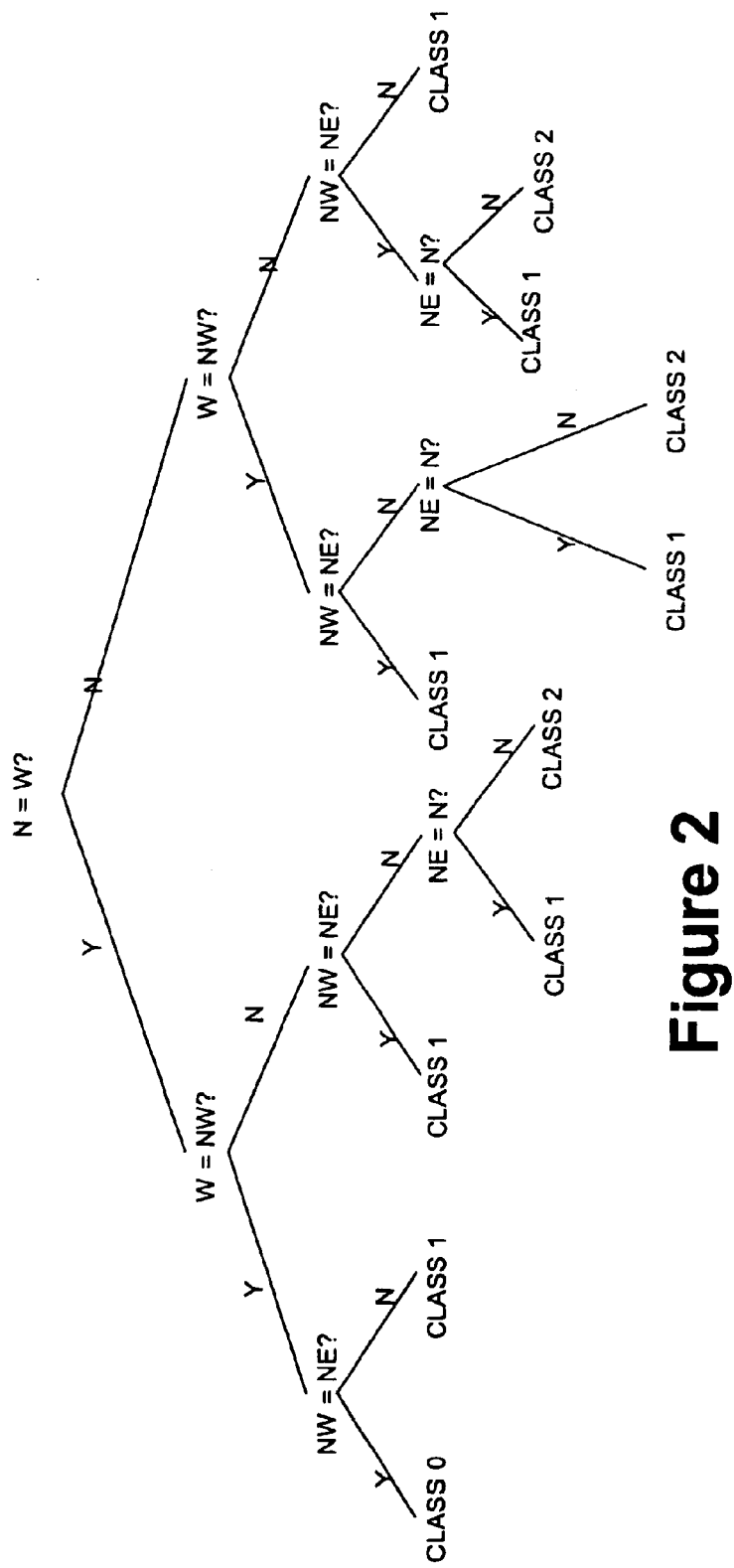

COMPOUND DOCUMENT COMPRESSION BASED UPON NEIGHBORING PIXELS

BACKGROUND

1. Field

This disclosure relates to methods for image compression, more particularly to lossless compression method for computer-generated document images.

2. Background

Efficient storage and transmission of electronic images typically require some sort of compression. Compression techniques are generally referred to as lossless or lossy. Lossless compression means that the resulting image is identical to the input image. Lossy compression techniques may have some slight variation between the output image and the input image. The amount of variation between the input image and the output image is determined by the quality of the compression technique. The overall amount of compression achieved is determined by the efficiency of the compression technique. Generally, lossless techniques do not achieve as high efficiency as lossy techniques.

Examples of compression techniques are wide and varied. Compression techniques may compress binary text images, such as run-length encoding used in CCITT (Coinite International Telephonique et Telegraphique) group 3/4 standards and binary adaptive arithmetic coding used in JBIG (Joint Bi-level Image Experts Group) standard for facsimile transmission. Others may compress graphic images, such an Lempel-Ziv-Welch (LZW) compression, used in the Graphics Image File format (GIF). Still photographic images are typically compressed using the JPEG (Joint Photographic Experts Group) standard. However, JPEG is used mostly for lossy compression of photographic images, in which there will be a variation between the output image and the input image. Lossless compression methods for photographic images include JPEG-LS standard and a process called CALIC.

JPEG-LS is based upon the Low Complexity Lossless Compression for Images (LOCO-I) and is optimized for photographic images only. CALIC (Context-based Adaptive Lossless Image Coding) switches between either binary or continuous-tone and thus is capable of compressing both binary text and photographic images. More information on CALIC can be found in U.S. Pat. No. 5,903,676, issued May 11, 1999.

None of above-described methods are particularly designed to handle compound images, which are typically comprised of a mix of text, graphics, and photographic images. The few existing compression algorithms for compound image sources belong to the Mixed Raster Content (MRC) model-based approaches. MRC model employs a layer representation to decompose a document into three layers, e.g. background, foreground and mask. An example of this technique is shown in U.S. Pat. No. 5,778,092, issued Jul. 7, 1998. However, MRC-based approach is a lossy technique and suffers from the intrinsic redundancy of layer representations.

Therefore, it would seem that a lossless image compression technique that can efficiently handle compound images would be useful.

SUMMARY

One aspect of the disclosure is a method for compression of compound images. The method determines a classification for a current pixel based upon its causal neighbors and codes the pixel according to a mode determined by the classification. In one embodiment, the classification is singular mode, binary mode or continuous mode. This coding results in production of a symbol for the pixel and the symbol is then mapped to the output stream.

BRIEF DESCRIPTION OF THE DRAWINGS

The invention may be best understood by reading the disclosure with reference to the drawings, wherein:

FIG. 1 shows a current pixel with its four causal neighbors.

FIG. 2 shows a tree diagram for determining the classification result of a current pixel, in accordance with the invention.

DETAILED DESCRIPTION OF THE EMBODIMENTS

FIG. 1 shows a pixel value that will be compressed. The image will be scanned and compressed in raster scanning order. This has an advantage that it requires only one past line of data in the buffer, in addition to the current line. The pixel value to be compressed, X, is shown relative to its four causal neighbors, which will be referred to by their positions, northwest (NW), north (N), northeast (NE), and west (W). These neighbors are used to determine the local conditions in the image and accordingly choose appropriate compression technique.

In such a backward approach, a decoder can exactly duplicate the operations of the encoder such as classification and compression because it only requires the information contained in the causal neighbors. The only requirement is the initialization of encoding/decoding states. For example, the first pixel can be transmitted to the decoder without compression, and then both encoder and decoder have access to that pixel and can start the process after the synchronization. The classification of the pixel is used in the decoding process. There are four classes used here, as examples. It is possible that other classifications may be developed or used, so application of the invention is not limited to these classifications.

As mentioned above, the process uses backwards classification. The four causal neighbors determine the classification of the current pixel, which will determine the encoding process used to compress the current pixel, allowing to achieve nearly optimized performance for compound images. The classification will be performed by pair-wise comparison among the four causal neighbors, as shown in FIG. 2. The classification result is determined by how many distinct values appear in the four causal neighbors. If there is only one distinct value, the current pixel is defined as class 0. Within this class, it is highly probable that X is located in a smooth region and will be coded in a singular mode.

In class 1, the four causal neighbors have two distinct values. For example, N=W=NW, but NE does not equal N; or alternatively, N=W, NW=NE, but N does not equal NW. This is more than likely indicative of a binary pattern in either text or graphics, which will be coded in a binary mode. These two distinct values will be referred to as a local minimum and a local maximum. If there are more than two different values, it will be treated as class 2, which will be coded in a continuous mode.

Figure 3:
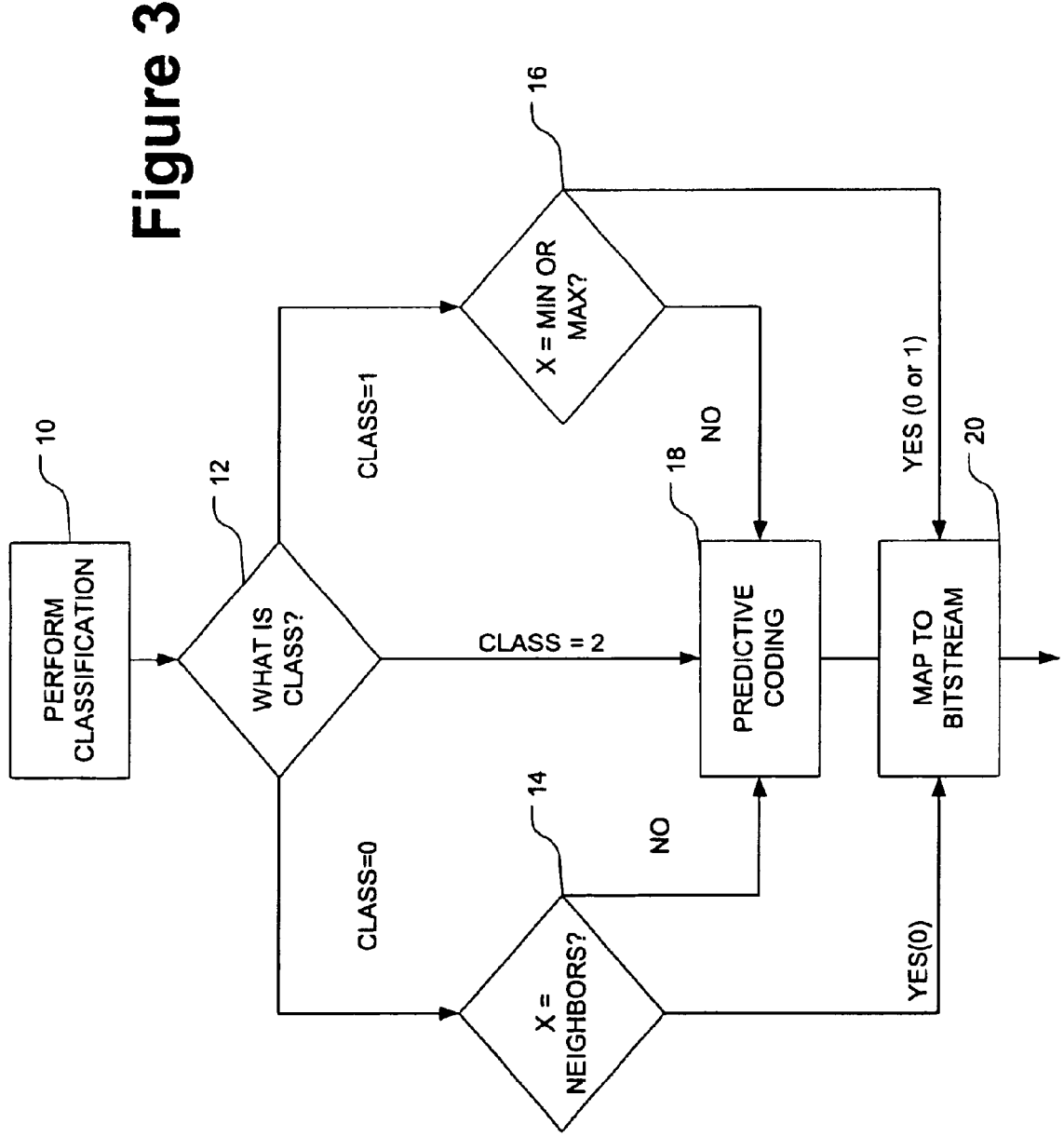
FIG. 3 shows a block diagram of the backward adaptive compression technique, in accordance with the invention.

The different classification results are used to determine how the current pixel is coded. A flowchart of an overall classification and coding process is shown in FIG. 3. At 10, the classification based on the local neighborhood is performed. Once the classification is performed at 10, it is used to determine which mode of encoding is used. If the class is 0, the coding is done in singular mode.

In singular mode, the neighbors are all the same value and the likelihood that the current pixel is equal to that value is high. A binary symbol is generated to indicate whether or not the current pixel is equal to it neighbors at 14. This symbol is first compressed into the bit stream at 20. The compression of the binary symbols is a mature technique, such as adaptive binary arithmetic coding in the JBIG standard. If a zero (Yes) symbol is generated, then decoder already knows the value of the current pixel. Otherwise (Escape mode), the pixel is encoded using predictive coding in continuous mode like class 2 pixels at 18, which will be discussed in more detail later.

Returning to 12, if the class is 1, there are two distinct values in the causal neighbors, a local minimum and a local maximum. The likelihood that the current pixel is equal to either of these is high. Therefore, at 16 a determination is made as to whether the pixel is equal to the local minimum or the local maximum, generating a ternary symbol S, for which 0 means equal to min, 1 means equal to max, and 2 means Escape. The resulting symbol, S, is coded by two concatenated adaptive binary arithmetic encoders. Adaptive binary arithmetic coding is a mature technique. Examples include the techniques used in the JBIG standard and those disclosed in U.S. Pat. No. 5,099,440, issued Mar. 24, 1992.

The first binary arithmetic encoder resolves whether or not the S equals zero, indicating that the current pixel is equal to the local minimum. If S is not equal to zero, the second binary arithmetic encoder determines if S is equal to 1. If S is neither an Escape symbol is generated, the encoding of the current pixel is done in continuous mode at 18. It should be noted that the usage of the second encoder is contingent on the result of the first encoder: S not equaling 0.

It can be shown that such concatenated approach does not sacrifice the coding efficiency because the probability that S equals a given value i, P(S=i) can be written as the product of two probabilities:

$$P(S=i) = P(S>0)\frac{P(S=i)}{P(S>0)}.$$

As long as the two encoders accurately estimate the above two probabilities online, the same amount of bits are used to compress S as a ternary arithmetic coder, though the computational complexity of a ternary coder is much higher than that of a binary coder.

To optimize the compression performance of the binary mode, a similar context based adaptive coding technique to JBIG standard is employed. The coding context may be chosen to be the decimal representation of a ternary vector $[t_n t_{nw} t_{ne} t_w]$, where each symbol of the vector $t_i$ is the classification result of the causal neighbor i. In total, there are $3^4=81$ different contexts. Such choice of the coding context attempts to capture the binary pattern frequently appearing in the text/graphics regions.

Having discussed the first two modes, the discussion now turns to the continuous mode. The pixel will be encoded using the continuous mode either because its class is 2, or it entered continuous mode from either the singular or binary modes when an Escape symbol was generated. This mode corresponds to the conventional predictive encoder such as the one used in the JPEG-LS standard. The prediction of the current pixel is obtained from its four nearest causal neighbors and the prediction residue is encoded instead of the original pixel value.

Many different kinds of predictors can be used. For compound image source, it was found that the Median Edge Detector (MED) prediction is both simple and effective. MED prediction is defined as follows:

$$\hat{x}=\text{median}(n,w,n+w-nw) \rightarrow e=x-\hat{x}.$$

Essentially, MED prediction always chooses the best or the second best predictor from the three candidates: n, w and n+w-nw. The residue, e, is first mapped to a non-negative integer d by d=-(2e+1), if e<0, and d=2e if e≧0, and then take a modular with the alphabet size M. As an example, for 8-bit grayscale images, the alphabet size is 256). Such mapping technique is referred to in the description of JPEG-LS standard.

In JPEG-LS, Golomb coding techniques, which can be shown to be optimized for a two-sided exponential distribution source, are used to compress the mapped residues d. However, Golomb codes would seriously hurt the performance of the compression, as the prediction errors generated by a compound image source generally do not observe the two-sided exponential distribution. An alternative approach would use multiple-alphabet arithmetic coding. The CALIC encoder mentioned above takes this approach. However, the computational complexity of multiple-alphabet arithmetic coding is prohibitive and thus impedes application in practice. Therefore, the approach of decomposing an M-ary arithmetic coder into $k=\lceil \log_2 M \rceil$, where $\lceil x \rceil$ denotes the smallest integer that is no smaller than x) concatenated binary arithmetic coders was taken.

Such decomposition can be viewed as a generalization of the method described to code ternary symbols in binary mode. Since the alphabet size of the prediction residue is still large (M=256) even after the symbol mapping, a simplified example is used to explain the binary expansion process without loss of generality. For example, if M equals 8, it can be decomposed into three concatenated stages, each of which resolves one bit of uncertainty. As mentioned above, the coding of a ternary symbol in binary mode requires two stages. A binary expansion tree of M=8 is shown below.

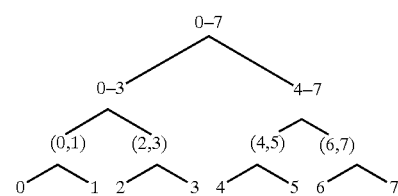

Each node in the expansion tree corresponds to an individual binary arithmetic encoder. In total there are $k=\log_2 M$ stages and M−1 nodes in the tree. Therefore, for the example of M=8, there are three stages as shown, and 7 binary arithmetic encoders. Each symbol is encoded bit by bit by traversing the tree from the top to the bottom.

Adaptive encoding is enabled in that the statistics are updated at all k nodes across the tree. In total, there are M−1 binary probability models requiring updated on the fly. In contrast to ad-hoc bit-plane encoding which also uses $k=\log_2 M$ binary arithmetic encoders, concatenated binary arithmetic encoders distinguishes in the aspect of conditional coding. It can be shown that the coding efficiency is not sacrificed if the coding at the k+1-stage is conditioned on the coding at the k-th stage.

Again, as an example, consider a symbol set with eight different symbols 0–7. A conventional multi-alphabet arithmetic coder would spend about $$\left\lceil \log_2 \frac{1}{P(S=7)} \right\rceil$$

bits where P(S=7) is obtained by collecting the statistics from the causal past. Concatenated binary arithmetic coder divides the task into three steps based on elementary probability theory:

$$P(S=7) = P(S>3) \cdot \frac{P(S>5)}{P(S>3)} \cdot \frac{P(S=7)}{P(S>5)};$$

where the first term, P(S>3) is stage 1, the second term is stage 2 and the third term is stage 3. Each adaptive binary arithmetic coder updates its probability model on the fly within each coding context as the generated symbol d is transmitted to the decoder. Since each arithmetic coder only deals with two distinct symbols, the binary probability models quickly converge towards the actual statistics. This causes little sacrifice on coding efficiency.

Figure 4:
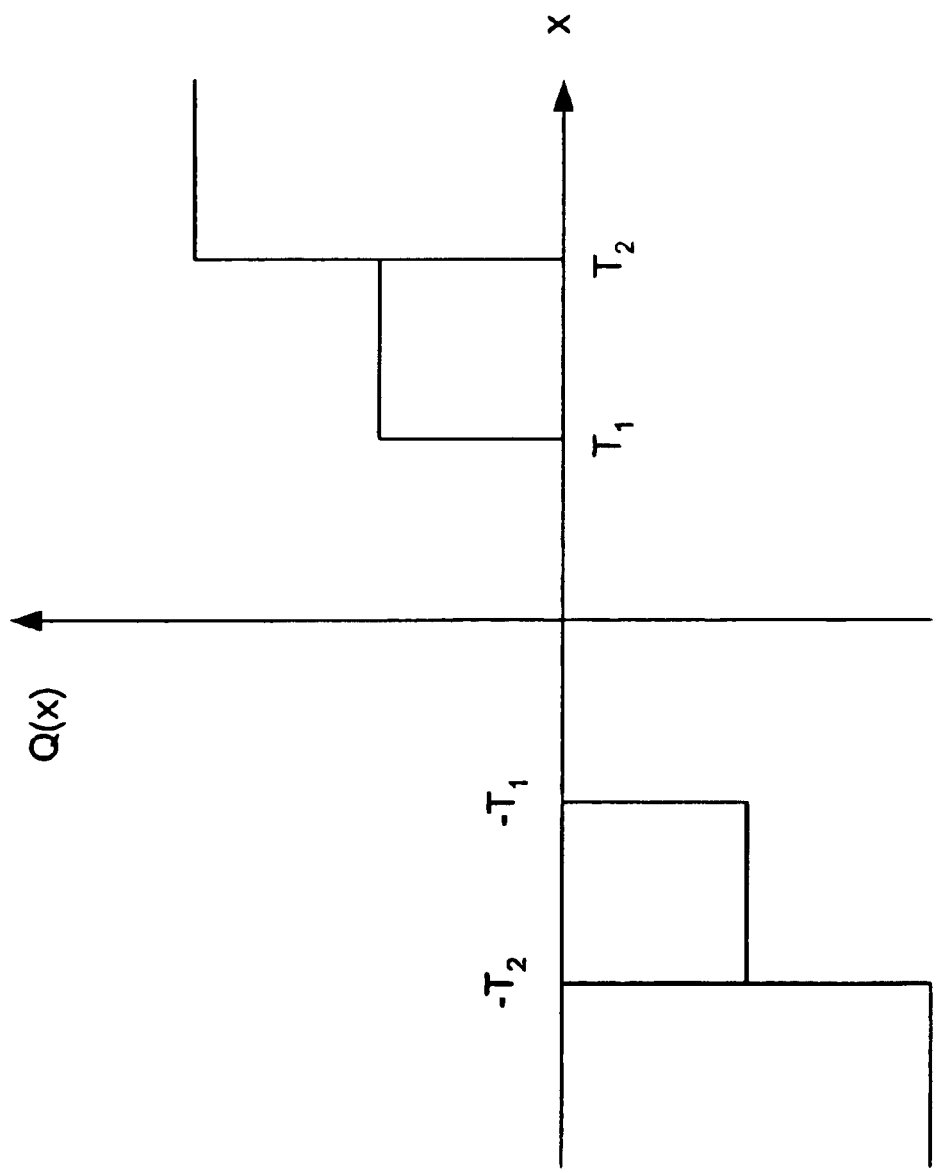
FIG. 4 shows a graphical representation of the five-level quantizer for the gradients in the process of determining coding context.

Similar to JPEG-LS, the coding context for each symbol d is based on the quantized gradients Q(ne−n), Q(n−nw), Q(nw−w). The quantizer Q(.) is a nonlinear mapping from [−255,255] to {−2,−1,0,1,2} as shown in FIG. 4. The thresholds $T_1$, and $T_2$ are user-defined parameters. A thumb rule to choose this parameter is that a gradient below $T_1$ (e.g. 8) indicates a high probability of flat-region event and a gradient above $T_2$ (e.g. 32) indicates a high probability of edge event. The pixels classified as class 2 are considered as belonging to a different class than the pixels that are classified as singular or binary mode (classes 0 or 1) but enter continuous mode because of the failure of the prediction in their respective classes. There are $5^3$ (class 2)+1(escape mode)=126 coding contexts for the coding of prediction residues.

In this manner, a lossless compression scheme can be implemented to operate on compound images. In experiments, this encoder was tested against several others, as shown in the table below. Eight images of varying size and composition were used. In the table, the field θ indicates a rough estimate of the fraction of photographic images. The image size is the compression ratio of the file size of the original image to the file size of the compressed image.

As can be seen, as more and more text and graphics are contained in the original image, the less efficient the other lossless compression schemes such as CALIC and JPEG-LS become. Meanwhile, even on images with a higher photographic content, the proposed encoder achieves comparable compression to the more computational expensive CALIC and specially designed JPEG-LS. This indicates that the invented encoder is better suited for compound images than the existing other lossless compression encoders.

| Image | Size | JPEG-LS | CALIC | LZW | Ours | θ |
|---|---|---|---|---|---|---|
| A | 2048 × 2560 | 1.80 | 1.87 | 1.30 | 1.71 | 0.89 |
| B | 2048 × 2560 | 1.84 | 1.91 | 1.39 | 1.77 | 0.81 |
| C | 5120 × 6624 | 5.56 | 5.24 | 6.44 | 10.29 | 0.14 |
| D | 1275 × 1650 | 5.38 | 6.31 | 7.93 | 7.85 | 0.12 |
| E | 904 × 988 | 8.36 | 9.65 | 11.41 | 12.42 | 0.07 |
| F | 788 × 895 | 7.91 | 9.74 | 10.32 | 11.64 | 0.08 |
| G | 1650 × 1275 | 33.78 | 96.26 | 54.97 | 189.27 | 0.01 |
| H | 1275 × 1650 | 55.01 | 152.77 | 59.38 | 258.19 | 0.00 |

The images used above were all computer-generated. This encoder can also be used for lossy compression of scanned documents. With some slight adjustments to the process with regard to quantization, this approach will work rather easily. For example, a quantizer is designed first. Instead of using pixel values as the inputs to the lossless encoder described above, the quantization indexes are used. Alternatively, the quantizer can also be placed inside the predictive loop like the conventional DPCM schemes. These are just some examples of how the above described encoder and compression scheme can be used in lossy compression of scanned images.

With a slight extension, this encoder can also be used to compress computer-generated color images. An ad-hoc extension is to compress each color plane independently. More aggressive approaches include applying a color transformation into (Y,U,V) space or incorporating the reference plane into the context modeling in order to exploit the dependency among color planes.

More than likely, the methods of the invention will be implemented as an article containing instructions in machine-readable form. When read and executed, the instructions will cause the machine to execute the methods of the invention.

Thus, although there has been described to this point a particular embodiment for a method and apparatus for lossless compression of compound images, it is not intended that such specific references be considered as limitations upon the scope of this invention except in-so-far as set forth in the following claims.

What is claimed is:

1. A method for compression of compound images, the method comprising:
   determining a classification for a current pixel based upon pairwise comparisons of its causal neighbors;
   coding the pixel using conditional coding according to a mode determined by the classification, producing a symbol for the pixel, wherein the conditional coding further comprises:
      obtaining a context model for binary and ternary symbols from the causal neighbors and coding a current symbol according to the context model;
      obtaining a quantized context model for continuous symbols from the causal neighbors and coding a current symbol according to the context model; and
      representing non-binary symbols using a binary expansion tree coding of a symbol by a series of decision nodes traversing the expansion tree, wherein coding of the decision node is always conditioned upon a parent in the binary expansion tree; and
   mapping the symbol to an output bit stream.

2. The method of claim 1, wherein determining the classification for a current pixel further comprises:
   obtaining a number of distinct values from the pairwise comparisons of the causal neighbors by no more than four logical comparisons; and determining the classification according to the number of distinct values determined from the pairwise comparisons.

3. The method of claim 1, wherein the classification of the current pixel is class 0, and the method further comprises:
   determining whether the current pixel is equal to its causal neighbors;
   if the current pixel is equal to its causal neighbors, encoding a "Yes" symbol by conditional coding; and
   if the current pixel is not equal to its causal neighbors, encoding a "No" symbol by conditional coding and coding the pixel according to a continuous mode.

4. The method of claim 1, wherein the classification of the current pixel is class 1 and the method further comprises:
   determining whether the current pixel is equal to one of either the local minimum or the local maximum;
   if the current pixel is equal to the local minimum encoding a "Yes" symbol and a binary symbol denoting that the current pixel is equal to the local minimum by conditional coding;
   if the current pixel is equal to the local maximum encoding a "Yes" symbol and a binary symbol denoting that the current pixel is equal to the local maximum by conditional coding;
   if the current pixel is not equal to either the local minimum or the local maximum, encoding a "No" symbol by conditional coding and coding the pixel according to a continuous mode.

5. The method of claim 1, wherein the mode is a continuous mode and the method further comprises:
   obtaining a prediction of the current pixel from the four causal neighbors;
   determining a prediction residue from the prediction of the current pixel; and
   mapping the prediction residue to an output, wherein the mapping is performed by first representing a symbol by a binary expansion tree and then encoding node decisions by conditional coding.

6. The method of claim 4, wherein the prediction of the current pixel further comprises using a median edge detection predictor.

7. The method of claim 1, wherein coding of binary symbols is accomplished by an adaptive binary arithmetic coder.

8. An article, including machine-readable instructions that, when executed, cause the machine to:
   determine a classification for a current pixel based upon pairwise comparisons of the causal neighbors of the current pixel;
   code the pixel according to a mode determined by the classification, producing a symbol for the pixel, wherein coding the pixel further comprises conditionally coding the symbol by:
      obtaining a context model for binary and ternary symbols from the causal neighbors and coding a current symbol according to the context model;
      obtaining a quantized context model for continuous symbols from the causal neighbors and coding a current symbol according to the context model; and
      representing non-binary symbols using a binary expansion tree coding a symbol by a series of decision nodes traversing the expansion tree, wherein coding of the decision node is always conditioned upon a parent in the binary expansion free man the symbol to an output bit stream.

* * * * *

UNITED STATES PATENT AND TRADEMARK OFFICE
CERTIFICATE OF CORRECTION

PATENT NO.   : 6,865,298 B2
DATED        : March 8, 2005
INVENTOR(S)  : Li

It is certified that error appears in the above-identified patent and that said Letters Patent is hereby corrected as shown below:

Column 8,
Line 31, replace "binary expansion free man" with -- binary expansion tree map --.

Signed and Sealed this

Fourteenth Day of March, 2006

JON W. DUDAS
*Director of the United States Patent and Trademark Office*